Feb. 16, 1943.　　　T. J. BAY　　　2,310,927
CONDENSER TUBE PROTECTOR
Filed Jan. 3, 1942
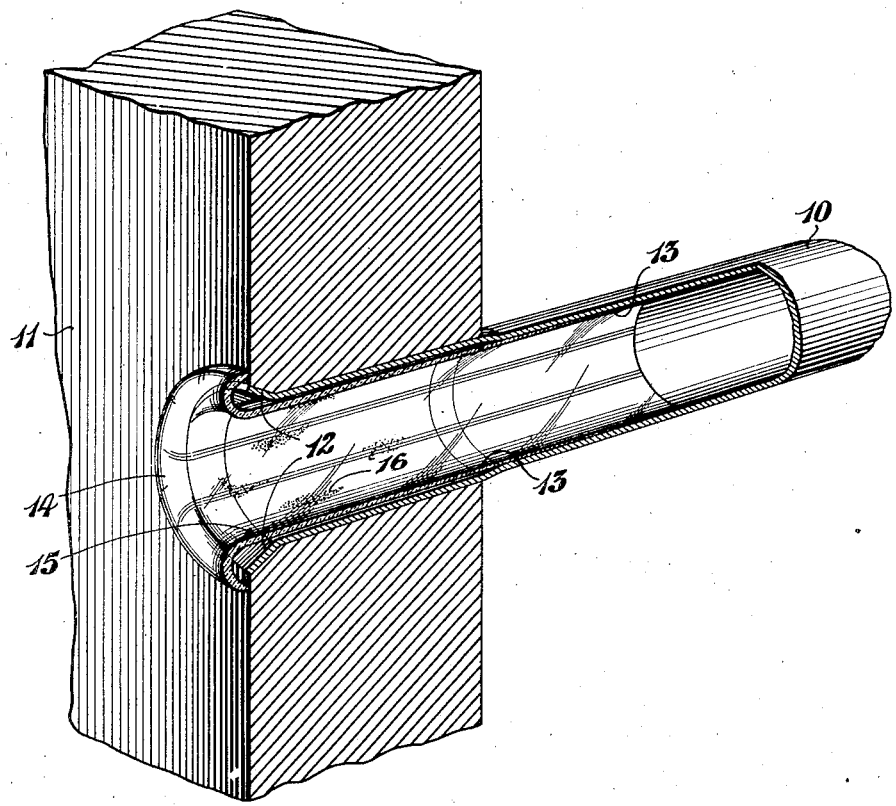
Inventor
Thomas J. Bay,
By
Attorney Patented Feb. 16, 1943

2,310,927

UNITED STATES PATENT OFFICE 2,310,927

CONDENSER TUBE PROTECTOR

Thomas J. Bay, United States Navy

Application January 3, 1942, Serial No. 425,530

1 Claim. (Cl. 285—54)

(Granted under the act of March 3, 1883, as amended April 30, 1928; 370 O. G. 757)

This invention relates to condenser tube protectors and it has particular relation to protectors such as those disclosed in my Patent No. 2,157,107, granted May 9, 1939; No. 2,195,403, granted Aug. 2, 1940, and No. 2,225,615, granted Dec. 24, 1940, and it has for its principal object the provision of a new and improved protector of the character referred to.

Development and tests of soft synthetic rubber tube end protectors, such as that disclosed in my Patent No. 2,157,107, demonstrated their high resistance to impingement erosion and positive protection of condenser tube ends. Difficulty was experienced, however, in developing a suitable method of securing the soft rubber protectors in place. The types of cement which are adequate to secure the soft rubber protectors in place complicate insertion of the protectors and therefore tests were made to determine whether metal retaining bushings incorporated into the design of the protectors would eliminate the necessity for use of cement. Patent No. 2,195,403 was based on these tests. Experiments conducted with soft rubber protectors provided with retaining bushings met with limited success but the provision of these bushings complicated manufacture and increased the cost of production.

In view of the difficulty of securing soft rubber protectors in place, tube end protectors constructed of "Bakelite" were next developed and tested. These "Bakelite" protectors were found to protect condenser tube ends from impingement erosion and electrolytic corrosion fully as well as soft rubber protectors and to possess several advantages over soft rubber protectors, particularly from the standpoint of ease of installations. Patent No. 2,225,615, covering protectors constructed of thermosetting materials, such as "Bakelite" and also protectors constructed of hard rubber, was based on these experiments. Protectors of this type have proved highly satisfactory and are now in use in naval condenser installations.

Celluloid and many other commonly used thermoplastic materials are entirely deficient from the standpoint of resistance to the relatively high temperatures encountered under certain conditions of condenser operation. However, certain other thermoplastic materials such as "Lucite," methyl methacrylate resin base plastics are available in forms capable of withstanding the temperature conditions encountered in the use of condenser tube protectors. Also, thermoplastic materials which combine silicon and carbon base constituents are capable of withstanding temperatures higher than any encountered in condenser tubes even during condenser boiling out operations. Technical developments in the field of plastics manufacture have made possible the combination of creosol-formaldehyde and creosol-furfuralformaldehyde type resins to provide materials highly resistant to heat, having, in addition, thermoplastic characteristics. Thermoplastic materials possessing the desirable characteristics of thermosetting plastics for the present application can therefore be so compounded as to provide for a predetermined degree of thermoplasticity without undue sacrifice of heat resistance.

Tube end protectors constructed of heat resistant thermoplastic materials and materials combining characteristics of thermosetting and thermoplastic materials possess certain important advantages over protectors made of straight thermosetting materials; two of the more important advantages being associated with the transparency of the material and the relatively high percentage of elongation and/or compressibility obtainable; that is to say, its ability to deform under load without breaking.

The advantage of an insert having transparent walls over one constructed of opaque material is obvious in that the former permits examination of the metal condenser tube wall under the insert at a glance without the necessity for removal of the tube end protector. Heretofore, it has been necessary to cement the opaque thermosetting inserts into the tube ends, thus removal for inspection of the metal tube ends is a difficult operation, in that the protector is destroyed during the process. The normal method of removing the opaque thermosetting inserts is by tapping the inner surface, threading a stud into the tapped hole and exerting a gradual direct pull for removal. This becomes a laborious procedure when applied to the several thousand tubes installed in the average steam condenser and in addition the tube end protector is destroyed as a result of the process. The provision of transparent tube end protectors eliminates the necessity for general removal of the inserts for inspection of tube ends. Only the individual removal of an occasional insert is required when a visual examination through the transparent insert material of the metal tube beneath the insert reveals local corrosive conditions which may exist due to isolated instances of imperfect sealing of the joint between the insert and the tube end.

A second advantage associated with the use of thermoplastic materials in lieu of thermosetting materials for the production of tube end protectors is found in the relatively high percentage of elongation passessed by the former. The reasons for this advantage can be appreciated when consideration is given to the application, and particularly to the commercial tolerances encountered in the condenser tubes into which the tube end protectors are inserted, as effecting variations in the inside diameter of the tubes. Naval specifications and most commercial purchase specifications for condenser tubes permit an outside diameter tolerance of 5 to 6 thousandths of an inch. This, combined with a customary 5 per cent overweight tolerance, allows a variation in inside diameter up to about 14 thousandths of an inch. In view of the fact that thermosetting materials are rigid, having practically zero percentage elongation, inserts made of this material must have an outside diameter not greater than 2 or 3 thousandths of an inch larger than the smallest tube to be fitted with protectors; otherwise, the excessive force required to install the protectors causes their fracture by reason of their inability to deform under stress. Since the protectors fabricated from a thermosetting material must be kept small to fit the portion of the tubes having small inside diameters, they are necessarily a loose fit in the larger tubes, making mandatory the use of cement for securing the protectors and causing a more abrupt "hydraulic jump," that is to say, the annular shoulder caused by the difference between the inside diameter of the inner end of the insert and the inside diameter of the condenser tube. Both of these undesirable characteristics are eliminated by the use of protectors of suitable thermoplastic resins having high percentage of elongation. Such inserts can be made large enough in outside diameter to fit tightly in the largest tubes and, because of relatively great percentage of elongation, are flexible enough to be forced into the smaller tubes encountered in service applications without the use of undue force. Thus, the use of cement can be eliminated and a snug fit in all condenser tubes of the same nominal size range assured.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawing means for carrying the invention into practical use, without limiting the improvements in their useful application to the particular construction, which, for the purpose of explanation, have been made the subject of illustration.

The single figure of the accompanying drawing is a perspective view in longitudinal section of a condenser tube insert embodying the invention.

Referring to the drawing, a condenser tube 10 is shown as being secured in a header plate 11 of a surface condenser, the outer or inlet end of the tube being flared as indicated at 12. A tubular corrosion protector 13 fabricated from a material which is chemically inert with respect to the metal of the tube and header plate, such as a thermoplastic material having the desired characteristics hereinbefore mentioned, is frictionally secured within the inlet end of the condenser tube 10 with a drive fit. The outer end of the protector 13 is flared and curved inwardly as at 14 so as to enclose the outer flared end 12 of the tube, so as to effectively seal the juncture of the tube and plate against any electro-chemical action of the water or other electrolyte passing through the tube. The protector 13 is contoured so as to provide a restricted throat 15 and its internal diameter increases inwardly until it merges with the outside wall of the protector, thus forming a feathered inner edge. The contour of the throat 15 corresponds substantially to the contraction and enlargement of a stream of water passing through an orifice, thereby minimizing turbulence and the liberation of air from the water and also eliminates impingement erosion and friction loss in the jet of water entering the tube.

A protector insert molded from a thermoplastic such as those heretofore mentioned is sufficiently stiff or rigid to enable a rapid assembly of the protectors in the condenser tubes and is, at the same time, sufficiently tough, elastic and chemically inert to resist impingement erosion and chemical corrosion, indicated at 16 heretofore encountered. The relatively high modulus of elongation of a thermoplastic insures that the protector will conform to the interior diameter of the condenser tube within prescribed tolerances, thus dispensing with the necessity of cement, and the transparent property of a thermoplastic enables the inner surface of the condenser tube to be quickly inspected around its entire circumference for corrosion caused by improper sealing contact with the protector. This latter feature of a transparent thermoplastic material is of great practical importance when it is considered that modern surface condensers embody from 500 to 15,000 condenser tubes. Obviously, it is prohibitive to remove and destroy such a large number of protectors, a large proportion of which are in perfect sealing contact with the tubes, merely to locate a few protectors that are improperly installed and as a result are allowing corrosion to set in between the protector and the tube. On the other hand, if the corrosion of only a few tubes is permitted to progress to ultimate failure for the reason that it cannot be readily detected, the entire condenser may have to be shut down until the tubes thus destroyed are replaced. Thus, it will be apparent that the fabrication of condenser tube protectors from a transparent material constitutes a decided advance in prolonging the effective life of surface condensers, decreasing the expense of upkeep and increasing service reliability. This increased reliability is of the utmost importance in naval installations when, under conditions encountered in a naval engagement where the stresses and strains caused by rapid maneuvers and heavy gun-fire might otherwise cause the failure of partially deteriorated condenser tubes and the consequent disastrous shutdown of the propelling unit or units associated with such condenser.

It will be understood that the above description and accompanying drawing comprehend only the general and preferred embodiment of the invention, and that various changes in construction, proportion and arrangment of the parts may be made within the scope of the appended claim without sacrificing any of the advantages of the invention.

The invention described herein may be manufactured and used by or for the Government of the United States of America for governmental purposes without the payment of any royalties thereon or therefor.

Having thus set forth and disclosed the nature of this invention, what is claimed is:

Means for protecting from corrosion and erosion the inlet end of a tube extending through a header plate of a surface condenser, comprising a tubular insert of transparent material which is resistant to corrosion and capable of retaining its initial hardness in the presence of salt water and heat, said insert having sufficient longitudinal rigidity to permit it to be forced into the inlet end of said tube with a relatively tight fit and possessing a high degree of elongation to permit it to absorb the impact of media entering said tube and to permit it to adapt itself to tubes, the internal diameters of which may vary within reasonable tolerances, the transparent property of said material providing for the visual inspection of the interior surface of said condenser tube throughout the entire circumferential area of said insert to determine if deterioration caused by imperfect sealing contact between said insert and said tube exists, without removal of said insert from said tube.

THOMAS J. BAY.